(12) United States Patent
Ikeda

(10) Patent No.: US 6,282,200 B1
(45) Date of Patent: Aug. 28, 2001

(54) ATM PROCESSING APPARATUS

(75) Inventor: Hiroshi Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/073,431

(22) Filed: May 6, 1998

(30) Foreign Application Priority Data

May 7, 1997 (JP) .................................................. 9-116867

(51) Int. Cl.[7] .................................................. H04L 12/28
(52) U.S. Cl. .......................... 370/397; 370/395; 370/351
(58) Field of Search .................................. 370/398, 474, 370/513, 232, 412, 358, 248, 256, 233, 465, 467, 351, 365, 380, 253, 522, 521, 395–397, 468–472, 506; 709/232, 250, 401

(56) References Cited

U.S. PATENT DOCUMENTS 5,835,710 * 11/1998 Nagami et al. ........................ 370/351
5,867,677 * 2/1999 Tsukamoto ............................ 370/395
6,002,692 * 12/1999 Wills ...................................... 370/465

FOREIGN PATENT DOCUMENTS 5-37568    2/1993    (JP) .

OTHER PUBLICATIONS

B–ISDN ATM Adaptation Layer (AAL) Type 5 Specification, (1996).

* cited by examiner

Primary Examiner—Wellington Chin
Assistant Examiner—Prenell Jones
(74) Attorney, Agent, or Firm—Foley & Lardner

(57) ABSTRACT

An ATM processing apparatus for collecting packet-level traffic information without an ATM router or other related connections. The ATM apparatus comprises line interface units connected to communication lines and processing an Asynchronous Transfer Mode (ATM) cell; each of the line interface units comprises: a physical line termination unit; an ATM processing unit; and an AAL statistical information collection unit for taking in cell flow between the physical line termination unit and the ATM processing unit and the collection of AAL-level statistical information.

3 Claims, 4 Drawing Sheets

PT=000 USER DATA,NO CONGESTION,SDU TYPE=0
   001 USER DATA,NO CONGESTION,SDU TYPE=1(ENDING CELL)
   010 USER DATA, CONGESTION,SDU TYPE=0
   011 USER DATA, CONGESTION,SDU TYPE=1(ENDING CELL)

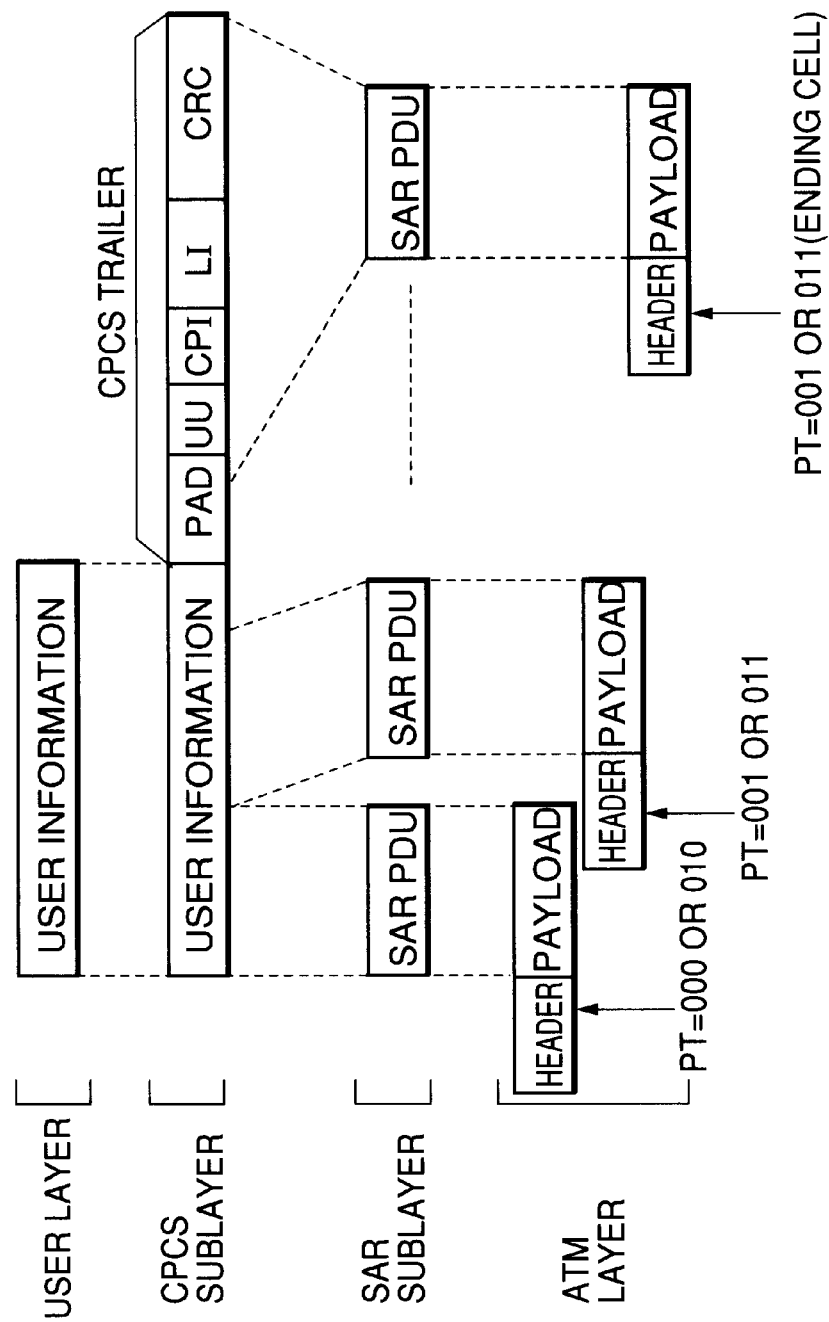

ATM PROCESSING APPARATUS

BACKGROUND OF THE INVENTION

The present invention relates to an ATM (Asynchronous Transfer Mode) apparatus coping with ATM cells; particularly relating to an apparatus which collects statistical information on user traffic.

Conventional ATM processing apparatus represented by a switching system have a function of collecting user traffic, and statistical information in the ATM layer's cell level. The function is performed by a line interface unit or an ATM switching unit or other related connections, which counts the number of passed-by cells and discarded cells, etc.

However, the following problems appear for the networks in which data communication networks, such as the Internet represented by the Internet Protocol Over ATM (IPOA) or Next Hop Resolution Protocol (NHRP), are constructed on the ATM networks. Specifically, no more than cell-level traffic information can be collected due to the fact that the ATM network has no capability to identify packets, even though actual traffic is made on the packet unit basis. Thus, no statistic information on packet-level traffic can be exactly collected.

Additionally, in the ATM network, the means for collecting packet-level statistical information requires an addition of a communication apparatus, such as the ATM router to the ATM network in order to terminate the ATM Adaptation Layer (AAL) and to rebuild a packet. This results in a large increase in cost and a deterioration of the data transmission throughput for a packet-level routing process in the ATM network.

SUMMARY OF THE INVENTION

Accordingly, the objective of the present invention is to provide an ATM processing apparatus for collecting packet-level traffic information at a low price, without introducing an additional apparatus such as an ATM router.

The ATM processing apparatus according to the present invention comprises an AAL statistical information collection unit which takes in cell flow between a physical line termination unit and an ATM cell processing unit, collecting AAL-level statistical information. The AAL statistical information collection unit comprises: a connection information table; which holds predetermined connection information, a cell check unit; which checks cell flow between the physical line termination unit and the ATM cell processing unit (by using the connection information to detect a cell including the ending part of a cell-based PDU [Protocol Data Unit] in an adaption layer), an information length detection unit; which detects the user information length from an information length field in an ending cell (when identified), a statistical information calculation unit; which calculates the information sent from both the cell check unit and the information length detection unit to modify the statistical information, and a statistical information table; which holds statistical information for each connection, accessed and modified by the statistical information calculation unit.

The cell check unit determines whether an input cell is of the AAL type and also whether it is an ending cell from the content of the connection information table, detecting the passage of one Protocol Data Unit (PDU). When an ending cell is then identified, the information length detection unit will know the payload length of the PDU, or user information length. To collect AAL-level, statistical information, the statistical information calculation unit can modify the statistical information table in accordance with both the Virtual Path Identifier (VPI)/Virtual Channel Identifier (VCI) values sent from the cell check unit, and the user information length sent from the information length detection unit.

BRIEF DESCRIPTION OF DRAWINGS

Other features and advantages of the invention will be made more apparent by the detailed description hereunder, taken in conjunction with the accompanying drawings, wherein:

FIG. 4 shows a PDU format in AAL-type 5.

DETAILED DESCRIPTION OF THE PREFERRED EMBODIMENT

Figure 1:
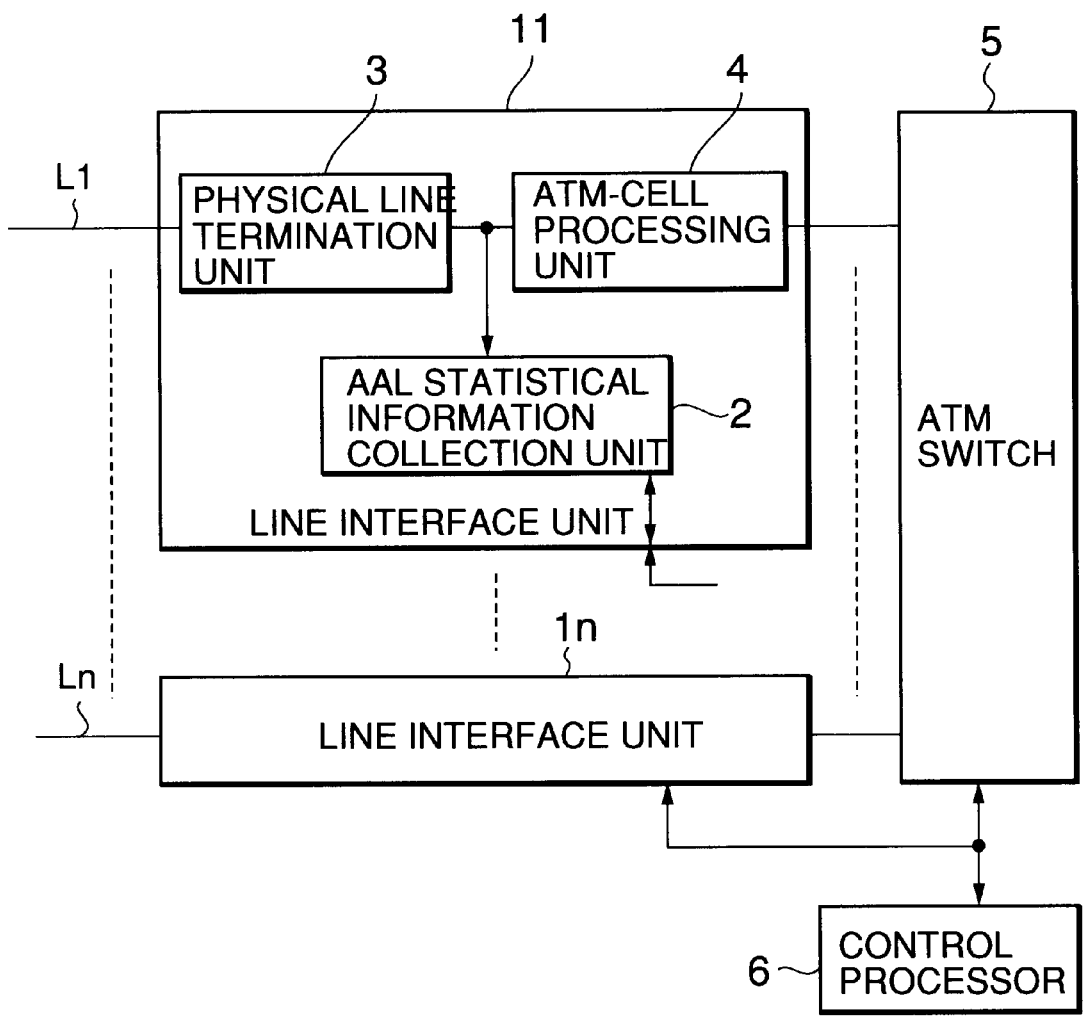
FIG. 1 shows the entire configuration of an ATM switching system according to the present invention.

FIG. 1 shows an example of the entire configuration of an ATM switching system according to the present invention. The ATM switching system is made up of several line interface units 11–1n, an ATM switch 5, and a control processor 6. Each of the line interface units 11–1n are connected to corresponding communication lines L1–Ln, the ATM switch 5, and the control processor 6. ATM-cell processing using a predetermined connection information is prepared by the control processor 6.

Line interface unit 11 is made up of an AAL statistical information collection unit 2, a physical line termination unit 3, and an ATM cell processing unit 4. To collect AAL statistical information, the AAL statistical information collection unit 2 takes in cell flow between the physical line termination unit 3 and the ATM cell processing unit 4. The structure and its operation previously mentioned equal to those of the other line interface units.

Figure 2:
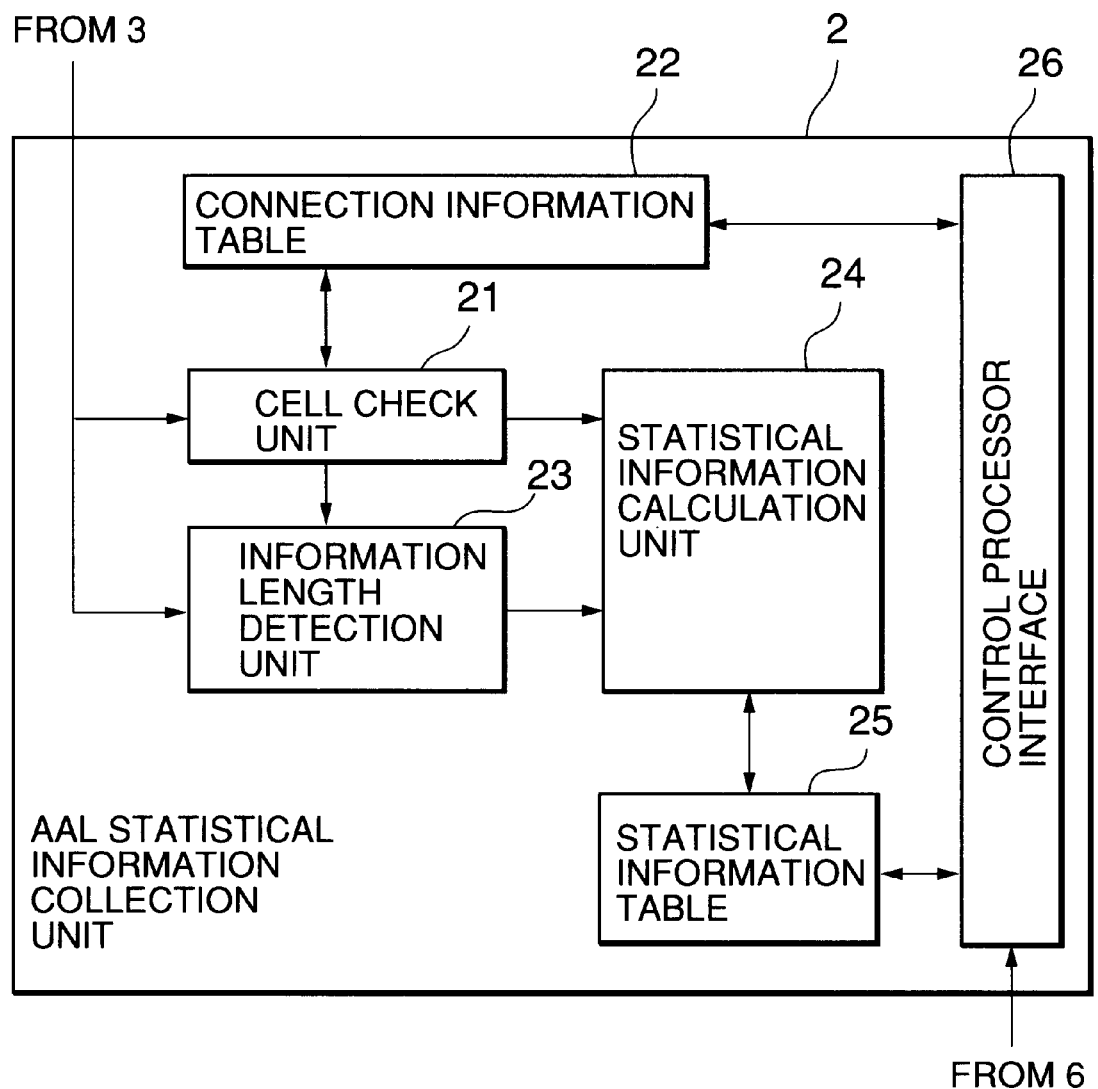
FIG. 2 shows the configuration of an AAL statistical information collection unit of a preferred embodiment according to the present invention.

FIG. 2 shows an example configuration of the AAL statistical information collection unit 2. The AAL statistical information collection unit 2 is made up of a connection information table 22; which holds connection information that the control processor 6 has set, a cell check unit 21; which checks that an input cell is an ending cell, an information length detection unit 23; which accesses the information length field in the ending cell detected by the cell check unit 21, a statistical information calculation unit 24; which modifies the statistical information table 25 by using connection identification information sent from the cell check unit 21 along with the information length obtained by the information length detection unit 23, a statistical information table 25; which holds the number of packets for each connection and statistical information such as an amount of information, a control processor interface 26; which helps the control processor 6, to set or access the connection information table 22 and the statistical information table 25.

The connection information table 22 can be configured, for example, to include the VPI/VCI values for the connection and the type of AAL (or information on whether it is AAL5).

The statistical information table 25 can include, for example, the VPI/VCI values for the connection and the cumulative traffic number of passing-AALs, and user data amount calculated from the accumulation of the information lengths.

Figure 3:
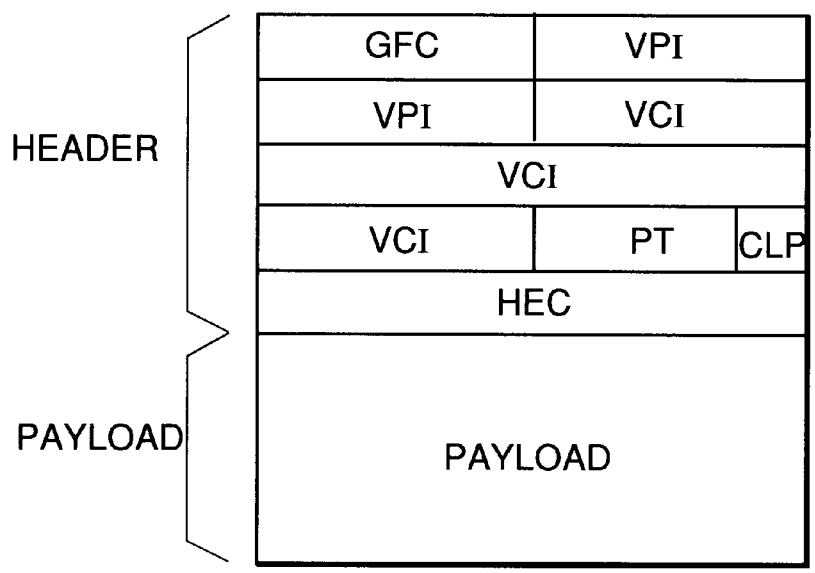
FIG. 3 shows the format of an ATM cell of a User Network Interface (UNI)

FIG. 3 shows the format of an ATM cell defined in ITU-T Recommendation I.361, ATM Forum specification UNI3.0/3.1. Payload Type (PT) is a field for identifying information type of information field. PT is referred to so as to identify whether the cell is an ending cell of the AAL type 5.

FIG. 4 shows the format of a PDU in AAL type 5, which is defined in ITU-T Recommendation I.363. AAL is including Common Part Convergence Sublayer (CPCS) and Segmentation and Reassembly Sublayer (SAR). CPCS adds controlling bits called trailer to the end of the frame. CPCS trailer is including an information length field (LI) for storing user information length.

An example operation of the AAL statistical information collection unit 4 will now be detailed for statistical information collection in the AAL type 5. When a connection is set by the control processor 6, via the control processor interface 26, both the VPI/VCI information and the AAL type (or information on identifying an AAL type 5 or otherwise) for the connection are set in the connection information table 22. An input cell via the communication lines passes through the physical line termination unit 3 where each of the communication lines is terminated and then input into: the ATM cell processing unit 4, the cell check unit 21 in the AAL statistical information collection unit 2, and the information length detection unit 23. The cell check unit 21 refers to the connection information table 22 with the VPI/VCI values in the input cell (shown in FIG. 3) as a pointer input cell. If the connection is not of AAL type 5, the operation on the input cell is terminated.

The cell check unit 21 refers to the PT field in the header in FIG. 3 if the connection is of the AAL type 5, and checks that the cell is an ending cell. If the PT value is "000" or "010", (which means the cell is not an ending cell,) the operation is terminated. Otherwise, if it is "001" or "011", (meaning an ending cell,) the statistical information calculation unit 24 is allowed by the cell check unit 21 to start its operation to output the VPI/VCI values and the information length detection unit 23 is then also allowed to start its operation.

The information length detection unit 23 detects and outputs the value (user information length) of LI in a CPCS trailer involved in a payload section in an ending cell shown in FIG. 4 to the statistical information calculation unit 24. On the other hand, the statistical information calculation unit 24 takes in the VPI/VCI values and the LI value, referring to the statistical information table 25 with the VPI/VCI values as a pointer, and then adds one to the read-out AAL counter; and further adding the LI value to the read-out user data amount. The added results are written in the statistical information table 25. The results in the statistical information table 25 are accessed by the control processor 6 via the control processor interface 26.

The aforementioned example operation has been shown for a cell input via a communication line. For a cell input to the line interface unit via the ATM switch, a similar operation to it will be performed.

According to the present invention, the traffic information, such as the information on the number of the AAL-CPCS-PDU, and user information amount, will be collected. This allows for the low-priced, simple structure of the ATM processing apparatus in which an AAL termination unit becomes unnecessary.

In addition, the information obtained here is valuable statistical information such as the IP packet number in TCP/IP and a packet length, which has been collected by no more than a conventional router or a gateway. However, this kind of statistical information can be measured without the need for a router or a gateway; and the operation control and maintenance of the network can be conducted with higher precision.

What is claimed is:

1. An ATM processing apparatus including a line interface unit, which is connected to communication lines, for processing an Asynchronous Transfer Mode (ATM) cell, said line interface unit comprising:

a physical line termination unit;

an ATM processing unit; and an AAL statistical information collection unit, which takes in cell flow between said physical line termination unit and said ATM processing unit to collect AAL-level statistical information.

2. The ATM processing apparatus according to claim 1, wherein said AAL statistical information collection unit comprises:

a connection information table means for holding predetermined connection information:

a cell check means for checking cell flow between said physical line termination unit and said ATM cell processing unit to detect an ending cell of a protocol data unit (PDU) in an ATM adaptation layer (AAL) which are divided into cells;

an information length detection means for detecting a user information length in an information length field within the ending cell detected by said cell check means;

a statistical information calculation means for calculating statistical information based on information sent from both the cell check means and the information length detection means; and a statistical information table for storing said statistical information for each connection which is accessed and modified by said statistical information calculation means.

3. The ATM processing apparatus according to claim 2, wherein VPI/VCI values and an AAL type (or information indicating AAL5) are set in said connection information table; and the VPI/VCI values for the connection, the cumulative number of corresponding passing AALs, and user data amount calculated from a cumulative information length are stored.

* * * * *